United States Patent
Avais

(10) Patent No.: US 9,816,037 B2
(45) Date of Patent: Nov. 14, 2017

(54) METHODS AND SYSTEMS FOR INCREASING PRODUCTION OF MIDDLE DISTILLATE HYDROCARBONS FROM HEAVY HYDROCARBON FEED DURING FLUID CATALYTIC CRACKING

(71) Applicant: UOP LLC, Des Plaines, IL (US)

(72) Inventor: Fariha Avais, Mount Prospect, IL (US)

(73) Assignee: UOP LLC, Des Plaines, IL (US)

( * ) Notice: Subject to any disclaimer, the term of this patent is extended or adjusted under 35 U.S.C. 154(b) by 259 days.

(21) Appl. No.: 14/493,207

(22) Filed: Sep. 22, 2014

(65) Prior Publication Data
US 2016/0083659 A1    Mar. 24, 2016

(51) Int. Cl.
C10G 51/02    (2006.01)
B01J 8/28    (2006.01)
C10G 11/18    (2006.01)

(52) U.S. Cl.
CPC .............. *C10G 51/026* (2013.01); *B01J 8/28* (2013.01); *C10G 11/182* (2013.01); *C10G 11/187* (2013.01); *B01J 2208/00796* (2013.01)

(58) Field of Classification Search
CPC .................................................... C10G 51/026
See application file for complete search history.

(56) References Cited

U.S. PATENT DOCUMENTS

| | | | |
|---|---|---|---|
| 3,437,604 A * | 4/1969 | Michalko | B01J 29/08 208/120.01 |
| 3,894,933 A * | 7/1975 | Owen | C10G 51/026 208/68 |
| 4,606,810 A | 8/1986 | Krambeck | |
| 5,126,036 A | 6/1992 | Owen | |
| 6,287,522 B1 | 9/2001 | Lomas | |
| 6,616,899 B1 | 9/2003 | Upson | |
| 7,029,571 B1 | 4/2006 | Bhattacharyya et al. | |
| 7,906,077 B2 | 3/2011 | Sandacz | |
| 2001/0042700 A1 | 11/2001 | Swan, III et al. | |
| 2013/0130889 A1 | 5/2013 | Gbordzoe et al. | |

FOREIGN PATENT DOCUMENTS

SU    1785261 A1 *    1/1996

OTHER PUBLICATIONS

Search Report dated Dec. 17, 2015 for corresponding PCT Appl. No. PCT/US2015/050878.
Zhang et al., Multifunctional Two-Stage Riser Catalytic Cracking of Heavy Oil, Ind. Eng. Chem. Res 2013, 52, 658-668.

* cited by examiner

*Primary Examiner* — Randy Boyer

(57) ABSTRACT

A method is provided for increasing production of middle distillate hydrocarbons from conversion of a heavy hydrocarbon feed in a fluid catalytic cracking system having a primary riser and a secondary riser, wherein the method comprises providing regenerated catalyst to the primary riser and operating the primary riser under severe conditions and providing spent catalyst to the secondary riser and operating the secondary riser under moderate conditions.

19 Claims, 5 Drawing Sheets

METHODS AND SYSTEMS FOR INCREASING PRODUCTION OF MIDDLE DISTILLATE HYDROCARBONS FROM HEAVY HYDROCARBON FEED DURING FLUID CATALYTIC CRACKING

TECHNICAL FIELD

The disclosure relates to fluid catalytic cracking (FCC) processes and systems and, more particularly to methods for increasing production of middle distillate products from heavy hydrocarbon feed during FCC and FCC systems having dual risers used in such methods.

BACKGROUND

Regardless of its place of origin, crude oil recovered from the earth is a broad mixture of different sizes and types of hydrocarbons, including for example $C_2$-$C_{50}$, or even higher, hydrocarbons that may be straight chain, branched or aromatic molecules. Different sizes and types of hydrocarbons have different properties, including boiling points, ignition temperatures, viscosities, and densities, among others, which makes them suitable for different uses. Accordingly, crude oil is typically first refined by atmospheric distillation to separate the crude oil into portions or "fractions," including light distillates, middle distillates, and heavy distillates and residuals. Each fraction is still a mixture of hydrocarbons of various types and sizes but, after separation by atmospheric distillation, each fraction contains a mixture of hydrocarbons having a narrower range of properties than the original crude oil mixture.

For example, the light distillate fraction obtained from atmospheric distillation of crude oil may include primarily $C_2$-$C_{10}$ hydrocarbons, which are the smaller, lighter hydrocarbon molecules from the original crude oil. Light distillates typically have a boiling point of up to about 177° C. (about 350° F.) and are useful, for example, as liquid petroleum gas, gasoline, and naphtha. Middle distillates may include primarily $C_8$-$C_{23}$ hydrocarbons, which are the mid-sized hydrocarbon molecules from the original crude oil. Middle distillates generally have a boiling point range of from about 149 to about 371° C. (about 300 to about 700° F.) and are useful, for example, as kerosene, diesel fuel, jet fuel, and light fuel oil. The heavy distillate fraction and residual products derived from atmospheric distillation of crude oil include primarily $C_{18}$ and higher hydrocarbons, which include the largest, heaviest hydrocarbon molecules from the original crude oil. Heavy distillates generally have a boiling point of at least about 260° C. (about 500° F.) and are useful, for example, as heavy fuel oil (HFO), lubricating oils, wax and asphalt.

Each of the distillate fractions described above may, in fact, contain very small amounts of hydrocarbons outside the aforesaid ranges, without altering the general characteristics of the distillate fractions. Furthermore, the aforesaid boiling point range for each distillate fraction is approximate and may vary slightly depending on the original composition of the crude oil and the desired apportionment of its component hydrocarbons among the fractions, which may in turn be influenced by local industry standards, market demand, and government regulation. Also, the operating conditions under which atmospheric distillation is performed can shift the quantity and particular property ranges of each fraction that is produced. Due to this variability, there is some overlap of the property ranges among the various fractions.

Any of the foregoing distillate fractions may be further refined to produce additional fractions having even narrower ranges of hydrocarbon types and sizes. For instance, heavy distillate and residual products may be further distilled, under vacuum conditions, to further refine the components of this heaviest fraction of crude oil. One product of vacuum distillation is vacuum gas oil (VGO), which may include primarily $C_{20}$-$C_{50}$ hydrocarbons and have a boiling point of from about 343 to about 552° C. (about 650 to about 1025° F.). Another example would be further refinement of a middle distillate fraction to produce a typical home heating oil (light diesel) fraction containing primarily $C_{10}$-$C_{20}$ hydrocarbons and having a boiling point range of from about 249 to about 349° C. (about 480 to about 660° F.).

Currently, there is greater market demand for light and middle distillates and the products derived therefrom than for the heavier distillation products. Consequently, heavy distillates and residuals, as well as VGO, and other heavy hydrocarbon feedstock are often converted to lighter hydrocarbons, such as those contained in the light and middle distillates. This conversion may, for example, be accomplished by processes such as thermal cracking and catalytic cracking. "Cracking" refers to processes during which the larger hydrocarbon molecules are "cracked," i.e., broken apart, into lighter, smaller hydrocarbon molecules.

In fluid catalytic cracking (FCC) processes, preheated fine particulate catalyst solids are fed to the bottom a vertical column or tube typically referred to as a "riser," along with a preheated heavy hydrocarbon feedstock, such as VGO, which is vaporized upon contact with the catalyst in the riser. Initially, the large hydrocarbons of the heavy hydrocarbon feedstock are converted to cracked hydrocarbon products comprising primarily middle-sized hydrocarbons, with some smaller light hydrocarbons also being formed. As the fluidized catalyst, vaporized feedstock and cracked hydrocarbon products continue to ascend in the riser, the cracking reaction continues, consuming the heavy hydrocarbons and also converting some of the middle-sized hydrocarbons to smaller light hydrocarbons.

Just as with atmospheric distillation, the operating conditions under which the FCC process is performed can shift the quantity of middle and light hydrocarbons that are produced. For example, lower temperatures or shorter residence times will reduce cracking of the middle hydrocarbons to light hydrocarbons, to provide more of the middle hydrocarbons in the final product but less of the light hydrocarbons, and may also result in lower conversion of the heavy hydrocarbon feedstock in a single pass through the riser. Likewise, higher temperatures or longer residence times will provide nearly 100 percent conversion of the heavy hydrocarbons, as well as increased yield of light hydrocarbon products, but will also decrease the amount of middle hydrocarbon products. Thus, FCC process operating conditions, such as temperature and residence time, may be selected to maximize production of the preferred products, whether middle distillate products, or light distillate products. The ability to control FCC processes and the hydrocarbon profile of the products therefrom is of high importance. As there is a great demand for middle distillates, a need exists for methods and systems that maximize the amount of middle distillate products produced during FCC.

Accordingly, it is desirable to provide methods and systems for increasing the production of preferred fractions, such as middle distillates, from heavy hydrocarbon feeds in a fluid catalytic cracking process.

BRIEF SUMMARY

Methods and systems for increasing production of middle distillate hydrocarbons from heavy hydrocarbon feed during FCC are provided. In accordance with an exemplary embodiment, a method is provided for fluid catalytic cracking comprising the steps of: contacting at least a portion of a heavy hydrocarbon feed with a fluidized regenerated catalyst in a primary riser to produce a primary cracked product that comprises primary spent catalyst; and separating the primary cracked product into the primary spent catalyst and a substantially catalyst-free primary cracked product. The method further comprises contacting an intermediate hydrocarbon feed with a fluidized spent catalyst to produce a secondary cracked product that comprises secondary spent catalyst, wherein the intermediate hydrocarbon feed comprises: at least a portion of the heavy hydrocarbon feed, or at least a portion of a different heavy hydrocarbon feed than is used in the primary riser, or combinations thereof; and separating the secondary cracked product into the secondary spent catalyst and a substantially catalyst-free secondary product comprising the middle distillates. Finally, the method further comprises providing regenerated catalyst to the primary riser and providing spent catalyst to the secondary riser.

In another embodiment, a method for fluid catalytic cracking, is provided and which comprises contacting at least a portion of a heavy hydrocarbon feed with a fluidized regenerated catalyst in the primary riser to produce a primary cracked product; contacting an intermediate hydrocarbon feed with a fluidized spent catalyst in a secondary riser to produce a secondary cracked product; combining said primary cracked product and said secondary cracked primary to form a combined cracked product; separating the combined cracked product gas into spent catalyst and a substantially catalyst-free cracked product comprising the middle distillates. The method further comprises, providing a portion of the spent catalyst to the secondary riser; contacting a different portion of the spent catalyst with an oxygen-containing gas to produce regenerated catalyst; and providing regenerated catalyst to the primary riser.

In another embodiment, a fluid catalytic cracking (FCC) system is also provided comprising a primary riser configured for contacting a heavy hydrocarbon feed with a regenerated catalyst and producing a primary cracked product; a secondary riser configured for contacting an intermediate hydrocarbon feed with a spent catalyst and producing a secondary cracked product; a separator in fluid communication with the primary riser, the secondary riser, or both, and configured for receiving and separating the primary cracked product, the secondary cracked product, or both, to form spent catalyst and a substantially catalyst-free cracked product; and a regenerator in fluid communication with the separator and configured for receiving and regenerating at least a portion of the spent catalyst with an oxygen-containing gas and thereby produce regenerated catalyst. Furthermore, the separator is in fluid communication with the secondary riser for providing at least a portion of spent catalyst to the secondary riser; and the regenerator is in fluid communication with the primary riser for providing regenerated catalyst to the primary riser.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
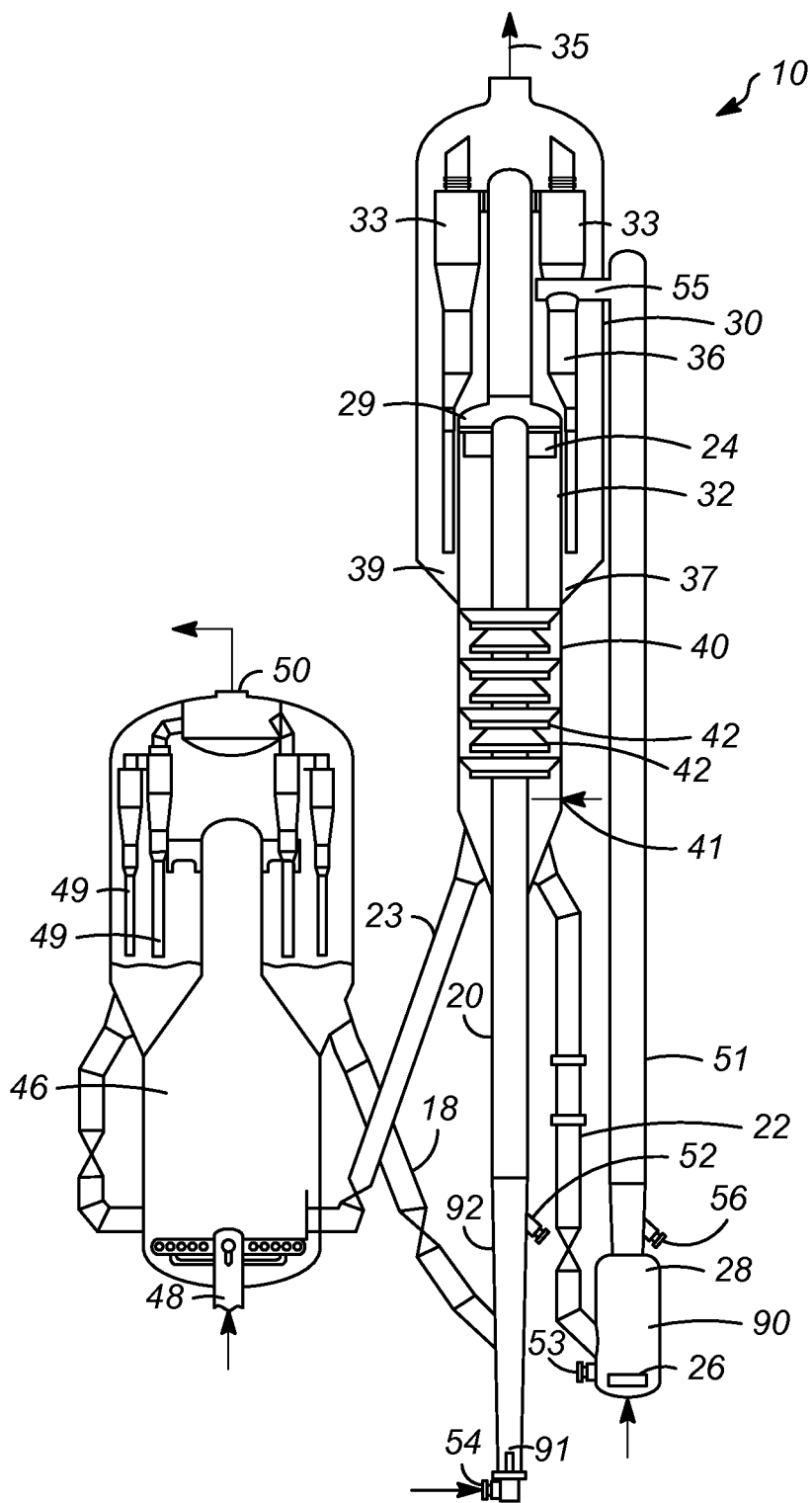
FIG. 1 is an elevated front view of an FCC system having primary and secondary risers and useful in the method described herein.

The following detailed description is merely exemplary in nature and is not intended to limit the invention or the application and uses of the invention. Furthermore, there is no intention to be bound by any theory presented in the preceding background or the following detailed description.

Various embodiments of the method and system described in detail hereinbelow relate generally to increasing production of middle distillate products from a heavy hydrocarbon feed in an FCC system. Specifically, the embodiments of the method relate to cracking at least a portion of a heavy hydrocarbon feed in a primary riser having fluidized regenerated catalyst therein, and cracking another portion of the heavy hydrocarbon feed in a secondary riser having fluidized spent catalyst therein under less severe conditions than in the primary riser. Such a method will enable operators of FCC systems and processes to more efficiently control the FCC process and the resulting hydrocarbon profile of the output. The methods and systems described hereinbelow can be used in the design of new FCC processes and processing facilities, or to modify the apparatus and operation of existing FCC processes and facilities.

An exemplary embodiment of a method for increasing production of middle distillates from heavy hydrocarbon feeds in accordance will now be described in detail. The desired middle distillates comprise, for example, hydrocarbons having primarily $C_8$-$C_{23}$ hydrocarbons with a boiling point of from about 149 to about 371° C. (about 300 to about 700° F.). A hydrocarbon fraction known as light cycle oil (LCO) has characteristics significantly overlapping middle distillates. In other words, LCO may also be characterized as comprising hydrocarbons having primarily $C_8$-$C_{20}$ hydrocarbons with a boiling point of from about 149 to about 371° C. (about 300 to about 700° F.). As used herein, the phrase "hydrocarbons having primarily" a specified range of carbon-numbered hydrocarbons means that the group or fraction of hydrocarbons being described may also contain very small amounts of hydrocarbons outside the stated carbon number range, without altering the general characteristics (e.g., boiling point) of the group or fraction being described. For example, the description that middle distillates comprise hydrocarbons having primarily $C_8$-$C_{23}$ hydrocarbons means that middle distillates contain at least 80 weight percent of hydrocarbon molecules each having from about 8 to about 23 carbon atoms with, possibly, very small amounts of hydrocarbon molecules each having less than about 8 carbon atoms, as well as very small amounts of hydrocarbon molecules each having more than 23 carbon atoms such that the boiling point remains in the range of from about 149 to about 371° C. (about 300 to about 700° F.).

The heavy hydrocarbon feeds may be any conventional FCC feed known now, or in the future, to persons of ordinary skill in the relevant art. For example, the most common of the conventional heavy hydrocarbon feeds is a vacuum gas oil (VGO) that typically comprises hydrocarbons having primarily $C_{18}$ and higher hydrocarbons and have a boiling point of at least about 343° C. (650° F.), for example, without limitation, from about 343 to about 552° C. (about 650 to about 1025° F.). VGO is typically prepared by vacuum distillation of the heavy distillates and residue produced from atmospheric distillation of crude oils. Furthermore, heavy cycle oil (HCO), which is a narrower fraction of the heavy distillates and residue produced from atmospheric distillation of crude oil and has a boiling point of from about 343 to about 565° C. (about 650 to about 1050° F.), is also a suitable heavy hydrocarbon feed. FCC processes are also known to produce HCO which are suitable for the heavy hydrocarbon feed used in the method described herein. Other heavy distillates or residual feeds, such as those comprising hydrocarbons having a boiling point above about 499° C. (about 930° F.), are also suitable. For example, without limitation, suitable heavy hydrocarbon feeds may be obtained from heavy bottoms from crude oil, heavy bitumen crude oil, shale oil, tar sand extract, deasphalted residue, products from coal liquefaction, atmospheric and vacuum reduced crudes, as well as combinations thereof. Hydrocarbon feeds that are heavier than naphtha range hydrocarbons, i.e., $C_5$-$C_9$ hydrocarbons having a boiling point above about 177° C. (about 350° F.), may also be useful as a component of the heavy hydrocarbon feeds suitable for use in the method contemplated herein. The heavy hydrocarbon feed may also be modified with other feeds with appropriate modifications such as understood by those of ordinary skill in the art.

The method for increasing production of middle distillate hydrocarbons from conversion of a heavy hydrocarbon feed comprises contacting at least a portion of the heavy hydrocarbon feed with a fluidized regenerated catalyst in a primary riser of an FCC system. This step produces a primary cracked product that comprises primary cracked hydrocarbons and primary spent catalyst.

More particularly, the step of contacting at least a portion of the heavy hydrocarbon feed with a fluidized regenerated catalyst is performed in the primary riser under relatively severe FCC operating conditions, with which persons having ordinary skill in the relevant art are familiar. Severe operating conditions suitable for the primary riser, for example, comprise a cracking temperature from about 482 to about 593° C. (about 900 to about 1100° F.). For example, without limitation, the cracking temperature in the primary riser may be from about 493 to about 504° C. (about 920 to about 940° F.), or even from about 504 to about 527° C. (about 940 to about 980° F.). Furthermore, a low contact time between the feedstock and the catalyst should be applied in the primary riser, i.e., in the range of from about 0.2 to about 3.0 seconds (sec), such as for example, from about 1.0 to about 3.0 sec.

As mentioned, the step of contacting the heavy hydrocarbon feed with regenerated catalyst produces a primary cracked product that comprises primary cracked hydrocarbons and primary spent catalyst. Generally, spent catalyst has diminished catalytic activity due to carbonaceous material, i.e., "coke," deposited thereon from the cracking reaction. As is well known in the art, the activity of spent catalyst can be restored by treating the spent catalyst with well-known regeneration methods, as will be described in detail below.

The next step of the method in this exemplary embodiment is separating the primary cracked product into the primary spent catalyst and a substantially catalyst-free primary cracked product comprising the primary cracked hydrocarbons. "Substantially catalyst-free," as this term is used herein, means that the substantially catalyst-free primary cracked product comprises less than 1 percent, by weight (wt %), of catalyst particles, based on the total weight of the substantially catalyst-free primary cracked product after separation and removal of the primary spent catalyst therefrom during the aforesaid separating step. This separating step may be accomplished using any separations methods and apparatus known, now or in the future, to persons of ordinary skill in the relevant art that will produce the primary spent catalyst and the substantially catalyst-free primary cracked product described above. For example, one or more cyclones are known to be effective and are commonly employed to accomplish the separating step.

After the aforesaid separating step, spent catalyst is regenerated by contacting at least a portion of the primary spent catalyst with an oxygen-containing gas to produce primary regenerated catalyst. The oxygen-containing gas provides molecular oxygen to oxidize coke from the primary spent catalyst thus treated. The term "oxygen-containing gas," as used herein, refers to any gas comprising from 0.01% up to 100% oxygen, including, for example, air. Thus, although the oxygen-containing gas may be pure oxygen gas, it is usually more economical to use an oxygen-containing gas such as air. In an exemplary embodiment, the step of contacting primary spent catalyst with an oxygen-containing gas is performed at elevated temperatures of from about 649 to about 760° C. (about 1200 to 1400° F.). In some embodiments, regeneration step may be performed at temperatures from about 677 to about 732° C. (about 1250 to about 1350° F.), or even from about 677 to about 760° C. (about 1250 to about 1400° F.).

Furthermore, the method for increasing production of middle distillate products from a heavy hydrocarbon feed comprises contacting an intermediate hydrocarbon feed with a fluidized spent catalyst in a secondary riser to produce a secondary cracked product that comprises secondary cracked hydrocarbons and secondary spent catalyst. The intermediate hydrocarbon feed may include: a portion of the substantially catalyst-free primary cracked product, a portion of the same heavy hydrocarbon feed that is provided to the primary riser, a portion of a different heavy hydrocarbon feed than is used in the primary riser, or a combination thereof. Additionally, in some embodiments, only spent catalyst, i.e., without regenerated catalyst, is provided to the secondary riser for contacting the intermediate hydrocarbon feed therein.

The step of contacting the intermediate hydrocarbon feed with the fluidized spent catalyst produces a secondary cracked product. This step is performed in the secondary riser under relatively moderate FCC operating conditions, such as those with which persons having ordinary skill in the relevant art are familiar. Moderate operating conditions suitable for the secondary riser comprise, for example, a cracking temperature from about 482 to about 593° C. (about 900 to about 1100° F.). For example, without limitation, the cracking temperature in the secondary riser may be from about 482 to about 510° C. (about 900 to about 950° F.), or even from about 510 to about 525° C. (about 950 to about 977° F.). The contact time between the feedstock and the catalyst in the secondary riser should kept in the range of from about 0.2 to about 3.0 sec, such as for example, from about 0.5 to about 2.5 sec.

Next, the secondary cracked product produced by contacting step is separated into secondary spent catalyst and a substantially catalyst-free secondary product comprising the secondary cracked hydrocarbons. The substantially catalyst-free secondary product comprises the desired middle distillate hydrocarbons and LCO. For example, the substantially catalyst-free secondary product gas comprises LCO in an amount of from about 14 to about 26 percent by volume (vol %), based on the total volume of the substantially catalyst-free secondary product gas. For example, without limitation, LCO is present in the substantially catalyst-free secondary product gas in an amount of from about 18 to about 24 vol %. In addition, it is noted that a portion of the substantially catalyst-free secondary product may be recycled and included in the intermediate hydrocarbon feed to the secondary riser. Thus, the intermediate hydrocarbon feed provided to the secondary riser may comprise: a portion of the substantially catalyst-free primary cracked product, a portion of the substantially catalyst-free secondary product, a portion of the same heavy hydrocarbon feed that is provided to the primary riser, a portion of a different heavy hydrocarbon feed than is used in the primary riser, or combinations thereof.

Furthermore, at least a portion of the secondary spent catalyst may be contacted with an oxygen-containing gas, in another step of the method, to produce secondary regenerated catalyst. This step of contacting secondary spent catalyst with an oxygen-containing gas is typically performed at elevated temperatures such as those provided herein above for the contacting and regeneration of the primary spent catalyst.

The steps of separating the primary cracked product into primary spent catalyst and substantially catalyst-free primary product and separating the secondary cracked product into secondary spent catalyst and substantially catalyst-free secondary product may be performed concurrently, such as by the same method, or in the same apparatus, or both by the same method and in the same apparatus. For example, each of the primary and secondary cracked products exiting from the primary and secondary risers, respectively, may be combined together into a single cracked product (not shown), which may then be subjected to a gas-solids separation method. Separation of the combined cracked product produces a spent catalyst comprising at least a portion of the primary spent catalyst and at least a portion of the secondary spent catalyst, as well as a substantially catalyst-free cracked product which comprises both primary and secondary cracked hydrocarbons from the primary and secondary cracked product, respectively.

The steps in which the primary and secondary spent catalysts are each contacted with an oxygen-containing gas may be performed concurrently, such as by the same method, or in the same apparatus, or both by the same method and in the same apparatus. For example, in embodiments where the steps of separating the primary and secondary spent catalysts from the primary and secondary cracked product, respectively, are performed concurrently in the same apparatus so that the primary and secondary spent catalysts are already combined together, then the combined spent catalyst may be contacted with an oxygen-containing gas in the same apparatus, under elevated temperatures. Even in other embodiments wherein the steps of separating the primary and secondary spent catalyst from the primary and secondary cracked product are performed independently so that primary spent catalyst and secondary spent catalyst are produced separately, they may be combined together and then contacted concurrently with an oxygen-containing gas in the same apparatus, at elevated temperatures.

The method contemplated and described herein for increasing production of middle distillate products from a heavy hydrocarbon feed further comprises providing regenerated catalyst to the primary riser for contacting the heavy hydrocarbon feed therein. As will be understood by persons of ordinary skill in the relevant art based on the foregoing description, the regenerated catalyst may comprise at least a portion of the primary regenerated catalyst, or at least a portion of the secondary regenerated catalyst, or both.

In addition, the method contemplated herein further comprises the step of providing spent catalyst to the secondary riser for contacting with the intermediate hydrocarbon feed, thus enabling the cracking reaction therein to continue. As will be understood by persons of ordinary skill in the relevant art based on the foregoing description, the spent catalyst may comprises at least a portion of the primary spent catalyst, or at least a portion of the secondary spent catalyst, or both.

The catalysts suitable for use in the method described and contemplated herein include large pore molecular sieves, such as, for example, synthetic X-type and Y-type zeolites, mordenite and faujasite, or combinations thereof. Typically, suitable large pore molecular sieves have pore openings of greater than about 0.7 nm in effective diameter. Such pore openings are defined by greater than about 10-membered rings, or even greater than about 12-membered rings. Pore Size Indices of large pores are greater than about 31. Suitable catalysts may comprise a matrix comprising a binder material such as silica or alumina and an inert filler material such as kaolin. Y-type zeolites with low rare earth content are particularly advantageous. "Low rare earth content" Y-type zeolites, as used herein, means less than or equal to about 1.0 (wt %) rare earth oxide on the zeolite portion of the catalyst.

Catalysts useful in the method described herein may advantageously include one or more catalyst additives, such as a medium or smaller pore zeolite catalyst exemplified by ZSM-5, ZSM-11, ZSM-12, ZSM-23, ZSM-35, ZSM-38. ZSM-48, and other similar materials, or combinations thereof. U.S. Pat. No. 3,702,886 describes ZSM-5, for example, and is hereby incorporated herein by reference. Other suitable medium or smaller pore zeolites include ferrierite, erionite, and ST-5, developed by Petroleos de Venezuela, S. A. Medium and smaller pore zeolites typically have an effective pore opening diameter of less than or equal to about 0.7 nm, rings of about 10 or fewer members, and a Pore Size Index of less than 31. The medium or smaller pore zeolite may, for example, be dispersed on the matrix of the large pore zeolite molecular sieve. The catalyst additive may also comprise other active materials such as, for example, beta zeolite. Such catalyst additives have a crystalline zeolite content of from about 10 to about 40 wt % or more, and a matrix material content of from about 60 to about 90 wt % or less. Catalyst additives containing about 25 wt % crystalline zeolite are typical.

In order to recover the middle distillates from the FCC system, the method contemplated and described herein may further comprise fractionating a cracked product feed stream to produce the middle distillates. The cracked product feed stream may comprise: at least a portion of the substantially catalyst-free primary cracked product, at least a portion of the substantially catalyst-free secondary cracked product, or both. In an exemplary embodiment, the middle distillates comprise primarily $C_8$-$C_{23}$ hydrocarbons having a boiling point of from about 149 to about 371° C. (about 300 to about 700° F.).

Figure 2:
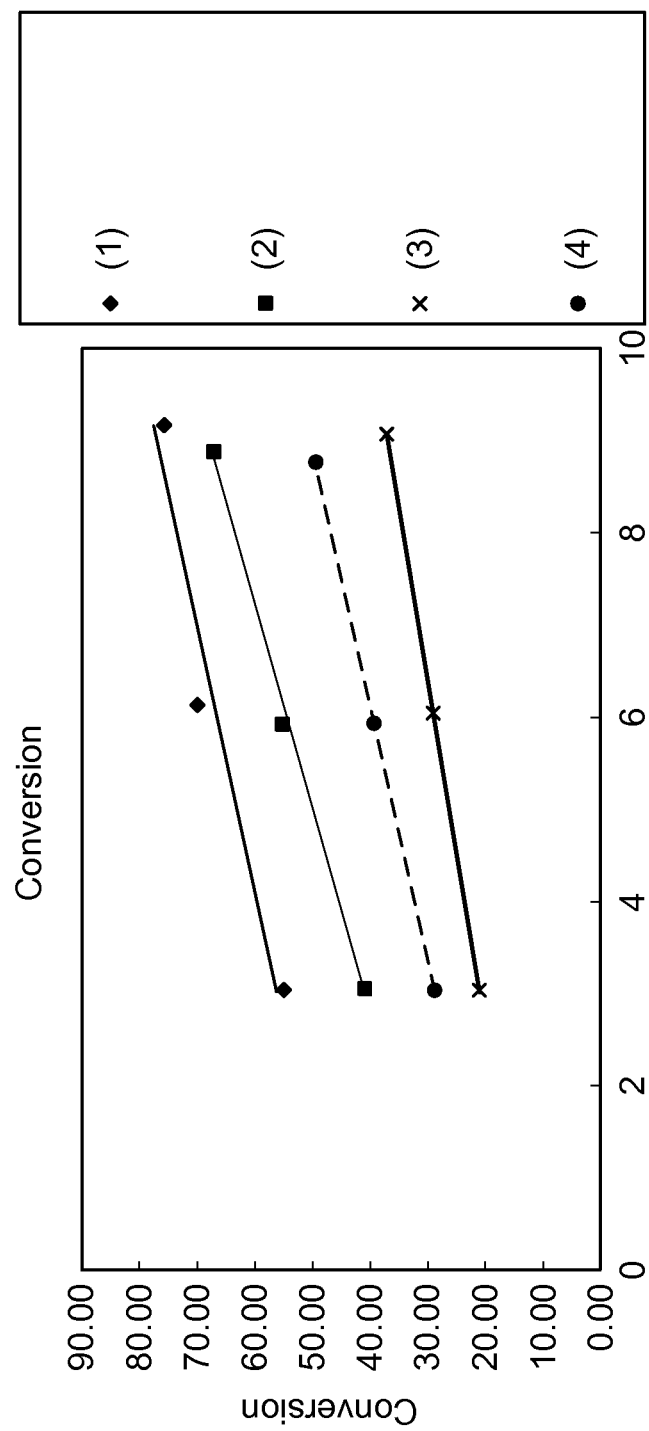
FIG. 2 is a plot showing the conversion achieved at various catalyst:oil ratios.
Figure 3:
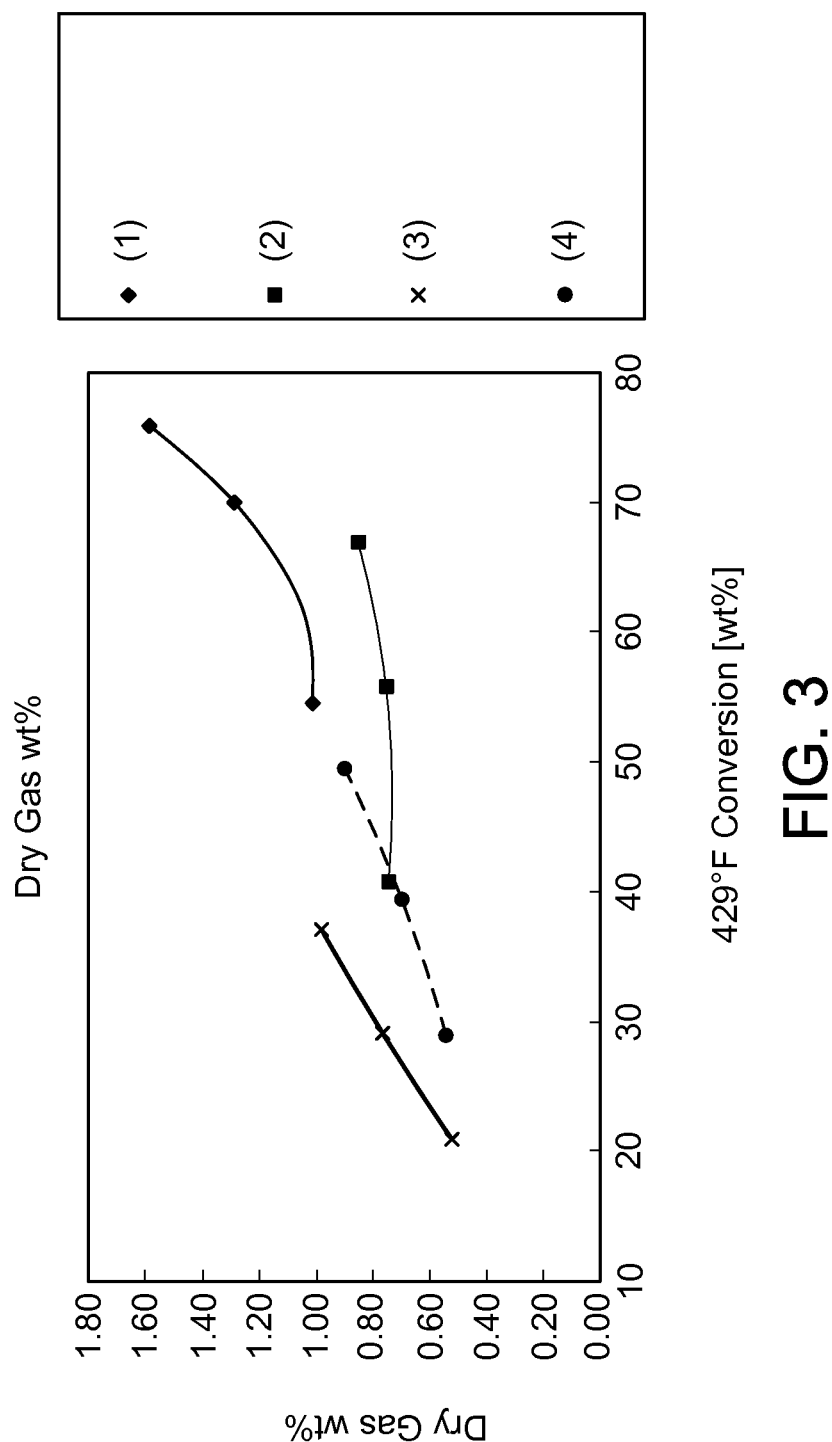
FIG. 3 is a plot showing the weight percent of dry gas produced at various conversions.
Figure 4:
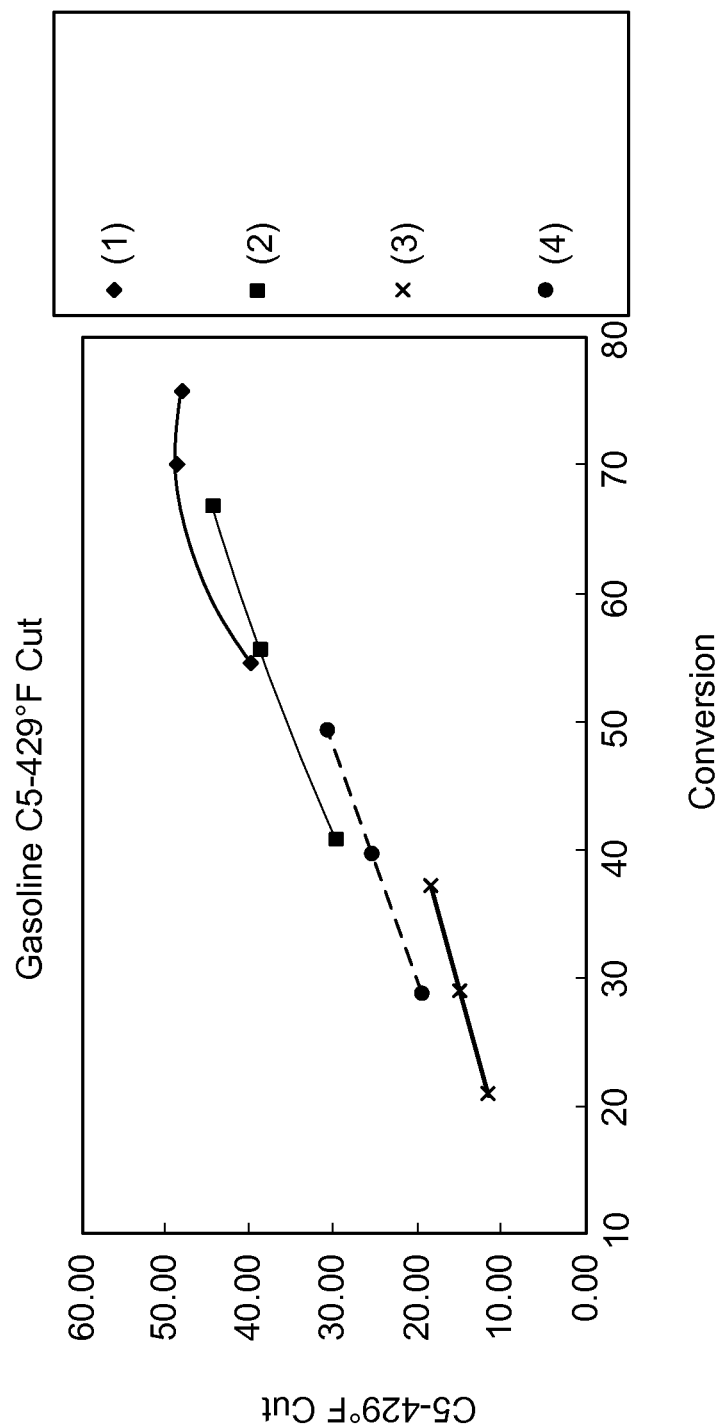
FIG. 4 is a plot showing the weight percent of gasoline weight hydrocarbons produced at various conversions.
Figure 5:
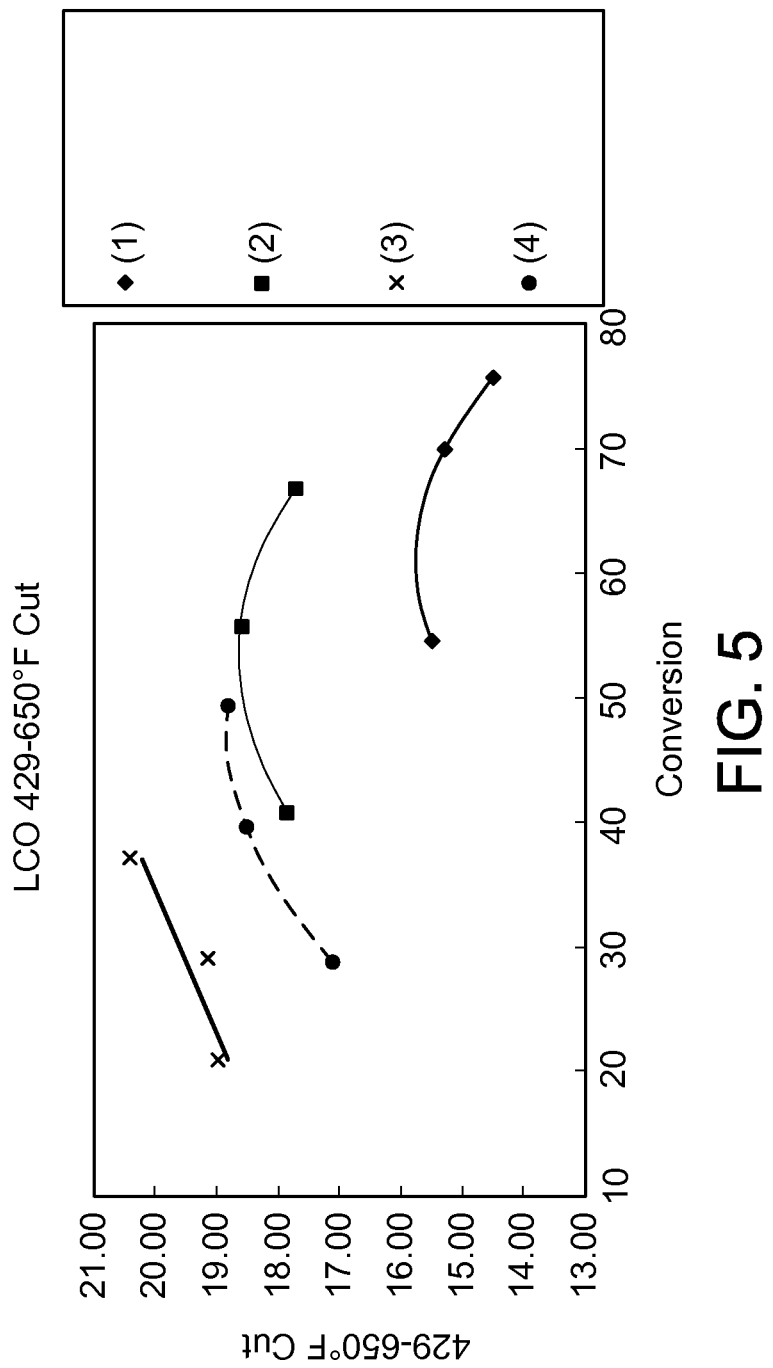
FIG. 5 is a plot showing the weight percent of light cycle oil (LCO) weight hydrocarbons produced at various conversions.

Optionally, the method may also comprise removing the adsorbed hydrocarbons from the primary spent catalyst, from the secondary spent catalyst, or from both spent catalysts. The step of removing adsorbed hydrocarbons from spent catalyst (see, e.g., FIG. 2) may be accomplished using any suitable methods and apparatus known, now or in the future, to persons of ordinary skill in the relevant art that will remove adsorbed hydrocarbons from spent catalyst without damage to the catalyst. For example, without limitation, the spent catalyst may be subjected to stripping with counter-current steam. In embodiments where spent catalyst is subjected to removal of adsorbed hydrocarbons, such removal is most advantageously performed prior to regeneration of the spent catalysts by contacting them with oxygen-containing gas.

With reference now to FIG. 1, an exemplary embodiment of an FCC system 10 suitable for performing the method contemplated and described herein for increasing production of middle distillates in an FCC process, will now be described in detail. The embodiment shown in FIG. 1 and described below is an example of an FCC process where primary and secondary risers are operated independently under severe and moderate conditions, respectively, in accordance with the method described above to produce primary and secondary cracked product gases. However, in the embodiment of FIG. 1, both the primary and secondary cracked products are concurrently separated in the same separator apparatus to form spent catalyst that comprises primary and secondary spent catalyst, as well as a combined cracked product that is substantially catalyst-free and comprises primary and secondary cracked products. Also as described below in connection with the embodiment shown in FIG. 1, since they are already combined in the spent catalyst, the primary and secondary spent catalysts are regenerated in a single regenerator by concurrently contacting them with an oxygen-containing gas.

When the method contemplated herein is performed using the FCC system 10 shown in FIG. 1, heavy hydrocarbon feed is provided to a primary riser 20, which contains regenerated catalyst (not shown per se). Similarly, an intermediate hydrocarbon feed is provided to a secondary riser 51 which contains spent catalyst (not shown per se). Typically, the regenerated and spent catalysts are fluidized in the primary and secondary risers 20, 51, respectively. At least a portion of the hydrocarbons in each feed are converted during contact with the catalysts in each of the primary and secondary risers 20, 51, respectively, to produce cracked hydrocarbons that are smaller and lighter than those originally contained in each of the feeds. For example, a primary cracked product comprising primary spent catalyst and primary cracked hydrocarbons exits from the primary riser 20. Similarly, a secondary cracked product comprising secondary spent catalyst and secondary cracked hydrocarbons exits from the secondary riser 51.

In the embodiment shown in FIG. 1, the primary and secondary cracked products from the primary and secondary risers 20, 51 are both provided to a separation chamber 32 contained within a reactor vessel 30. A plurality of cyclones 33 within the separation chamber 32 separates the primary and secondary spent catalysts from the primary and secondary cracked products concurrently. Optionally, residual adsorbed hydrocarbon may be removed from the surfaces of the spent catalysts in a stripping zone 40, for example as the spent catalysts travel over baffles 42. Spent catalyst, whether or not first subjected to stripping, is provided to the secondary riser 51 to catalyze the cracking reaction therein. The spent catalyst provided to the secondary riser 51 comprises at least a portion of the primary spent catalyst, or at least a portion of the secondary spent catalyst, or both.

In some exemplary embodiments, where the primary and secondary spent catalysts are separated from each of the primary and secondary cracked product separately, the primary and secondary spent catalysts may be provided separately to the secondary riser 51. In some instances of such embodiments, the primary and secondary spent catalysts may first be combined with one another and then at least a portion of the combined spent catalysts are provided to the secondary riser 51, as in the embodiment shown in FIG. 1.

Whether or not subjected to stripping, at least a portion of each of the primary and secondary spent catalysts are provided to a regenerator 46 having one or more stages of regeneration. In the FCC system 10 shown in FIG. 1, both the primary and secondary spent catalysts are contacted with an oxygen-containing gas, concurrently in a single regenerator 46, to produce regenerated catalyst comprising both regenerated primary catalyst and regenerated secondary catalyst. At least a portion of the regenerated catalyst from the regenerator 46 is provided to the primary riser 20 to continue the cracking reaction therein.

With reference still to FIG. 1, within the primary riser 20, hydrocarbons of the heavy hydrocarbon feed are cracked when contacted with regenerated catalyst. More particularly, a fluidization inert gaseous medium, such as steam from a nozzle 54, transports and fluidizes regenerated catalyst upwardly through the riser 20 at a relatively high density until a plurality of feed injection nozzles 52 inject heavy hydrocarbon feed across the flowing stream of catalyst particles, whereupon the heavy hydrocarbon is vaporized and contacts the fluidized catalyst. In similar fashion, within the secondary riser 51, the spent catalyst facilitates cracking of hydrocarbons of the heavy hydrocarbon feed provided thereto. In the embodiment shown in FIG. 1, the intermediate hydrocarbon feed may comprise HCO or a mixture of HCO and VGO. The HCO may be derived from the substantially catalyst-free primary product produced from the primary riser 20. The secondary riser 51 may have a smaller diameter than a mixing chamber 90, so that the spent catalyst accelerates as it passes out of the mixing chamber 90 into the riser 51. The secondary riser 51 typically operates with dilute phase conditions above the point of feed injection wherein the density is usually less than about 320 kilograms per cubic meter ("kg/m$^3$") (about 20 pound per cubic foot ("lb/ft$^3$") and, more typically, less than about 160 kg/m$^3$ (about 10 lb/ft$^3$).

The heavy hydrocarbon feed is introduced into the primary riser 20 by feed distributor 52 at a relatively lower elevation between a riser inlet 91 and a riser outlet 24. The intermediate hydrocarbon feed is introduced into the secondary riser 51 by feed distributor 56 at a relatively lower elevation between a riser inlet 28 and a riser outlet 55. Volumetric expansion resulting from the rapid vaporization of each feed as it enters its respective riser 20, 51 further decreases the density of the catalyst within the riser to typically less than above 160 kg/m$^3$ (about 10 lb/ft$^3$). The feed will ordinarily have a temperature in a range of from about 149 to about 373° C. (about 300 to about 700° F.) prior to contacting the catalyst.

Cracked products comprising spent catalyst and reacted cracked hydrocarbons are then discharged from the top of primary riser 20 and secondary riser 51, through the riser outlet 24 and riser outlet 55, respectively, and separated into a cracked product stream and a collection of catalyst particles covered with quantities of carbonaceous material, known as coke, and generally referred to as spent catalyst. Any arrangement of separators can be used to remove coked catalyst from the product stream quickly. In particular, a swirl arm arrangement 29 provided at the top of the primary riser 20 can further enhance initial catalyst and cracked hydrocarbon separation by imparting a tangential velocity to the exiting catalyst and cracked product stream mixture. The swirl arm arrangement 29 is located in an upper portion of the separation chamber 32, and the stripping zone 40 is situated in the lower portion of the separation chamber 32. Catalyst separated by the swirl arm arrangement 29 drops down into the stripping zone 40.

The cracked product stream comprising cracked hydrocarbons including gasoline and light olefins and some catalyst exit the separation chamber 32 via a gas conduit 36 in communication with cyclones 33. The cyclones 33 remove remaining catalyst particles from the cracked product stream to reduce particle concentrations to very low levels. The substantially catalyst-free cracked product then exits the top of the reactor vessel 30 through a product outlet 35. Spent catalyst separated by the cyclones 33 return to the reactor vessel 30 through diplegs and into a dense bed 39 where it will enter the stripping zone 40 through openings 37. The stripping zone 40 removes adsorbed hydrocarbons from the surface of the spent catalyst by counter-current contact with steam over the optional baffles 42. Steam enters the stripping zone 40 through a line 41.

A portion of the spent catalyst is provided to the secondary riser 51 without first undergoing regeneration while another portion of the spent catalyst is regenerated in the regenerator 46 and then provided to the primary riser 20. The spent catalyst portion to be recycled to the secondary riser 51 may be withdrawn from the stripping zone 40 and transferred to the mixing chamber 90 via a recycle conduit 22 at a rate regulated by a control valve (not shown). The other portion of the spent catalyst withdrawn from the stripping zone 40 is provided to the regenerator 46 through a spent catalyst conduit 23 at a rate regulated by a control valve (not shown) for the removal of coke from the spent catalyst.

On the regeneration side of the process, spent catalyst transferred to the regenerator 46 via the conduit 23 undergoes combustion of coke from the surface of the catalyst particles by contact with an oxygen-containing gas. The oxygen-containing gas enters the bottom of the regenerator 46 via a distributor 48 and passes through a dense fluidized bed of spent catalyst within the regenerator 46. Flue gas generator in the regenerator and consisting primarily of $N_2$, $H_2O$, $O_2$, $CO_2$, and perhaps some CO, passes upwardly from the dense fluidized catalyst bed into a dilute phase region of the regenerator 46. Within the regenerator 46, a separator, such as cyclones 49 or other means, remove entrained regenerated catalyst particles from the rising flue gas before the flue gas exits the regenerator 46 through an outlet 50. Combustion of coke from the catalyst particles raises the temperatures of the regenerated catalyst which is withdrawn by a regenerator standpipe 18. The regenerator standpipe 18 passes regenerated catalyst from the regenerator 46 into a mixing zone 92 at a rate regulated by a control valve (not shown) where it is mixed with fluidizing gas from nozzle 54.

In the embodiment of the FCC system 10 shown in FIG. 1, heavy hydrocarbon feed may be fed through the primary riser 20 at suitable conditions, and another portion of heavy hydrocarbon feed may be fed through the secondary riser 51 to produce a substantial yield of middle distillates, such as LCO, in preference to other products. Preferably, heavy hydrocarbon feed may have a residence time in the primary riser 20 of from about 1 second to about 3 seconds to maximize middle distillate yield. Residence time is the time it takes for the heavy hydrocarbon feed to travel from the distributor 52 to the riser outlet 24. Another portion of heavy hydrocarbon feed may be fed to the secondary riser 51 under operating conditions which also produce a substantial yield of middle distillates with greater selectivity than in primary riser 20. Preferably, residence time of the heavy hydrocarbon feed in the secondary riser 51 may be from about 0.5 second to about 2 seconds, to maximize formation of middle distillates.

When the FCC system 10 is operated in accordance with the method described herein for increasing production of middle distillate, the cracked product gas stream that exits from the product outlet 35 at the top of the reactor vessel 30, comprises LCO in an amount of from about 14 to about 26 percent, by volume (vol %), based on the total volume of the cracked product gas. In some embodiments, for example, the cracked product gas stream produced by the method contemplated and described herein comprises LCO in an amount of from about 18 to about 24 vol %. In other embodiments where the product gases of the risers 20, 51 (i.e., the primary and secondary cracked product gases, respectively) are subjected to spent catalyst separation and adsorbed hydrocarbons removal independently of one another and then the resulting primary and secondary substantially catalyst-free cracked product gases are combined into a single substantially catalyst-free cracked product gas, it is this single substantially catalyst-free cracked product gas that comprises LCO in an amount of from about 14 to about 26 vol %, based on the total volume of the cracked product gas.

Additionally, it is believed that production of middle distillates will be increased most efficiently using the FCC system 10 of FIG. 1 by performing the contacting steps to achieve a conversion rate in the range of from about 10% to no more than about 60% operating the FCC system 10 to achieve a conversion rate in a range of from about 10% to no more than about 60%, such as no more than about 50%, or no more than 45%, or even no more than 40%, based on the total moles of heavy hydrocarbons having boiling point of from about 429° C. to about 650° C. that are fed to the FCC system 10 (i.e., both the primary and secondary risers 20, 51).

Regenerated catalyst from the regenerator standpipe 18 will usually have a temperature in a range from about 677 to about 760° C. (about 1250 to about 1400° F.) and, more typically, in a range of from about 699 to about 760° C. (about 1290 to about 1400° F.). As mentioned above, a portion of the stripped spent catalyst from the stripping zone 40 may be provided to the secondary riser 51, without undergoing regeneration. The mixing chamber 90 may also be used to heat-up spent catalyst for sufficient time to achieve substantially thermal equilibrium. The temperature of the recycled spent catalyst portion will usually be in a range of from about 480 to about 621° C. (about 896 to about 1150° F.). The relative heating medium for spent catalyst will determine the temperature of the spent catalyst that enters the secondary riser 51. The heated spent catalyst should range from about 932 to about 977° F. (about 500 to about 525° C.).

Reaction pressure in the primary and secondary risers 20 and 51 may be, for example, from about 93 to about 113 kiloPascals (kPa). Higher hydrocarbon partial pressure in the risers 20 and 51 operates to favor the production of middle distillate products, including LCO. High hydrocarbon partial pressure can be achieved by minimizing use of steam or other inert gas as a diluents from nozzles 53 and 54. Typically in gasoline mode, FCC systems 10 are operated with about 0.5 to about 5 wt % steam to disperse the feed and purge stagnant zones. Only the fluidizing gas distributor 26 is shown in FIG. 1. However, other steam distributors may be provided along the risers 20 and 51 and elsewhere in the FCC system 10.

In accordance with this embodiment of the invention, a portion of the heavy cycle oil (HC) withdrawn from the primary riser 20, or a mix of vacuum gas oil (VGO) and heavy cycle oil (HCO), contacts spent catalyst in secondary riser 51. Riser 51 contacts the heavy cycle oil feed with spent catalyst withdrawn from stripping zone 40 by transfer line 22. Spent coke catalyst comes in contact with disperse heavy cycle oil provided by inlet nozzles 56. Typically, the catalyst circulation rate through the contacting conduit and the input of feed and any lift gas that enters the secondary riser 51 will again produce a flowing density of from about 3 lbs/ft$^3$ to about 20 lbs/ft$^3$ and an average velocity of from about 10 ft/sec to about 100 ft/sec for the gaseous mixture of catalyst and hydrocarbons. However, to provide low severity operating conditions the re-contacting conduit will operate with a low catalyst circulation. Typically the secondary riser 51 will have a catalyst-to-oil ratio in a range of from about 4 to about 14, with ratios of from about 5 to about 7 being particularly advantageous. Again, the length of the secondary riser 51 will usually be set to provide a residence time of from about 0.5 to about 10 seconds at these average flow velocity conditions. Low severity conditions in the secondary riser 51 will usually include lower temperature conditions that are normally from about 500 to about 525° C. (about 932 to about 977° F.).

The reacted heavy cycle oil passes upwardly through the secondary riser 51 and passes out of a riser outlet 55. Riser outlet 55 defines a downwardly projected outlet opening that provides an initial separation of the catalyst particles from the re-cracked heavy cycle oil. Any type of separation device may be used at the end of the secondary riser 51. Suitable separation devices should permit recovery of at least about 90 wt % of the gaseous products from the secondary conversion conduit that enter the separation zone.

Example

The following example illustrates the benefit from use of spent (carbonized or "coked") catalyst in the second riser of a two-riser FCC system as a method for reducing reactive severity in the secondary riser to favor production of LCO suitable for formulating diesel products. The example demonstrates four operating scenarios for FCC operation; i.e., one scenario as a base case for primary riser operation, and three scenarios for secondary riser operation. In this example, lab testing was conducted with each of the following:

(1) 100 wt % VGO feedstock (i.e., heavy hydrocarbon feed) with regenerated catalyst at a reaction temperature of 518° C. in a primary riser, (2) 100 wt % VGO feedstock with spent (carbonized or "coked") catalyst at a reaction temperature of 504° C. in a secondary riser, (3) 100 wt % HCO feedstock with spent catalyst at a reaction temperature of 504° C. in a secondary riser, and (4) 50 wt % HCO and 50 wt % VGO mixed feedstock with carbonized or "coked" catalyst at a reaction temperature of 504° C. in a secondary riser.

The aforesaid testing produced the conversion and yield slates shown in FIGS. 2-5.

It is noted that the primary riser base case (1), which is at higher severity compared to secondary riser cases, has the highest conversion and reduced LCO production due to production of side-products. Use of carbonized or spent catalyst helps reduce activity and reduce conversion which, in turn, serves to preserve LCO produced during reaction in the secondary riser. The particular composition of the heavy hydrocarbon feed can help further reduce activity and reduce LCO cracking to other unwanted products.

It is apparent that testing (2), (3) and (4) were successful in reducing conversion and consequently able to increase production of LCO compared to the base case (1).

As may be observed, with the secondary riser cases (2), (3) and (4), operating at lower severity or distillate mode can help reduce Dry Gas (DG) yields (which enables the use of the same existing gas recovery facilities). The gasoline yield, as desired, is reduced thereby contributing to reducing the excess of this fuel in the market (this reduction can easily reversed by adjusting the FCC operating mode to maximum gasoline at higher severity FCC operation).

While at least one exemplary embodiment has been presented in the foregoing detailed description of the method contemplated herein, it should be appreciated that a vast number of variations exist. It should also be appreciated that the exemplary embodiment or exemplary embodiments are only examples, and are not intended to limit the scope, applicability, or configuration, in any way, of the method for increasing production of middle distillates from heavy hydrocarbon feed in an FCC system. Rather, the foregoing detailed description will provide those skilled in the art with a convenient road map for implementing an exemplary embodiment of said method.

What is claimed is:

1. A method for fluid catalytic cracking, said method comprising the steps of:
    contacting at least a portion of a heavy hydrocarbon feed with a fluidized regenerated catalyst in a primary riser to produce a primary cracked product that comprises primary spent catalyst;
    separating the primary cracked product into the primary spent catalyst and a substantially catalyst-free primary cracked product;
    contacting an intermediate hydrocarbon feed with a fluidized spent catalyst in a secondary riser to produce a secondary cracked product comprising secondary spent catalyst, wherein the intermediate hydrocarbon feed comprises: at least a portion of the substantially catalyst-free primary cracked product, at least a portion of the heavy hydrocarbon feed, at least a portion of a different heavy hydrocarbon feed than is used in the primary riser, or combinations thereof;
    separating the secondary cracked product into the secondary spent catalyst and a substantially catalyst-free secondary product comprising middle distillates;
    providing regenerated catalyst to the primary riser; and
    providing spent catalyst to the secondary riser, wherein the spent catalyst comprises both the secondary spent catalyst and the primary spent catalyst.

2. The method of claim 1, further comprising:
    contacting at least a portion of the primary spent catalyst with an oxygen-containing gas to produce primary regenerated catalyst; and
    contacting at least a portion of the secondary spent catalyst with an oxygen containing gas to produce secondary regenerated catalyst,
    wherein the regenerated catalyst provided to the primary riser comprises at least a portion of the primary regenerated catalyst, or at least a portion of the secondary regenerated catalyst, or both; and
    wherein the spent catalyst provided to the secondary riser comprises at least a portion of the primary spent catalyst, or at least a portion of the secondary spent catalyst, or both.

3. The method of claim 2, wherein the steps of contacting at least a portion of the primary and secondary spent catalysts, respectively, with an oxygen-containing gas are performed concurrently in the same apparatus.

4. The method of claim 1, wherein the heavy hydrocarbon feed has a boiling point of about 500° F. (260° C.) or greater, and comprises primarily C18 and higher hydrocarbons.

5. The method of claim 4, wherein the heavy hydrocarbon feed comprises: vacuum gas oil, or heavy cycle oil, or both.

6. The method of claim 1, wherein the regenerated catalyst, primary spent catalyst and secondary spent catalyst each, independently, comprise a large pore molecular sieve having pore openings of greater than about 0.7 nm in effective diameter.

7. The method of claim 6, wherein the large pore molecular sieve comprises a synthetic X-type or Y-type material chosen from: zeolite, mordenite, faujasite and combinations thereof.

8. The method of claim 1, wherein only spent catalyst is provided to the secondary riser for contacting the intermediate hydrocarbon feed therein.

9. The method of claim 1, wherein the contacting steps are performed to achieve a conversion rate in a range of from about 10% to no more than about 60%.

10. The method of claim 1, wherein the intermediate hydrocarbon feed further comprises at least a portion of the substantially catalyst-free secondary cracked product.

11. The method of claim 1, wherein the steps of separating the primary and secondary cracked product are performed concurrently in the same apparatus to provide a spent catalyst comprising at least portions of each of the primary and secondary spent catalysts;
and a substantially catalyst-free product comprising at least a portion of each of the primary and secondary cracked product and comprising middle distillates in an amount of from about 14 to about 26 percent, by volume (vol %), based on the total volume of the combined substantially catalyst-free product gas.

12. The method of claim 1, further comprising the step of fractionating at least a portion of the substantially catalyst-free primary cracked product, at least a portion of the substantially catalyst-free secondary cracked product, or both, to produce the middle distillates.

13. The method of claim 1, further comprising fractionating a cracked product feed stream to produce the middle distillates, wherein the cracked product feed stream comprises: at least a portion of the substantially catalyst-free primary cracked primary product, at least a portion of the substantially catalyst-free secondary cracked product, or both.

14. The method of claim 13, wherein the middle distillates comprise primarily C8-C23 hydrocarbons having a boiling point of from about 149 to about 371° C. (about 300 to about 700° F.).

15. The method of claim 1, wherein the step of contacting at least a portion of a heavy hydrocarbon feed with a fluidized regenerated catalyst in the primary riser is performed under severe operating conditions comprising a cracking temperature of from about 482 to about 593° C. (about 900 to about 1100° F.).

16. The method of claim 1, wherein the step of contacting an intermediate hydrocarbon feed with a fluidized spent catalyst in the secondary riser is performed under moderate operating conditions comprising a cracking temperature of from about 482 to about 593° C. (about 900 to about 1100° F.).

17. The method of claim 1, wherein each of the primary and secondary spent catalysts provided by the separation steps has adsorbed hydrocarbons thereon, said method further comprising removing at least a portion of the adsorbed hydrocarbons from the primary spent catalyst, or from the secondary spent catalyst, or from both.

18. The method of claim 17, wherein the step of removing at least a portion of the adsorbed hydrocarbons comprises removing at least a portion of the adsorbed hydrocarbons from the primary spent catalyst and from the secondary spent catalyst concurrently in the same apparatus.

19. A method for fluid catalytic cracking, said method comprising the steps of:
contacting at least a portion of a heavy hydrocarbon feed with a fluidized regenerated catalyst in a primary riser to produce a primary cracked product comprising primary spent catalyst;
contacting an intermediate hydrocarbon feed with a fluidized spent catalyst in a secondary riser to produce a secondary cracked product comprising secondary spent catalyst;
combining said primary cracked product and said secondary cracked product to form a combined cracked product comprising spent catalyst;
separating the combined cracked product into spent catalyst and a substantially catalyst-free cracked product comprising middle distillates;
providing a portion of the spent catalyst to the secondary riser;
contacting a different portion of the spent catalyst with an oxygen-containing gas to produce regenerated catalyst; and
providing regenerated catalyst to the primary riser.

* * * * *